United States Patent
Gorog

(10) Patent No.: US 11,853,438 B2
(45) Date of Patent: Dec. 26, 2023

(54) PROVIDING CRYPTOGRAPHICALLY SECURE POST-SECRETS-PROVISIONING SERVICES

(71) Applicant: BlockFrame, Inc., Colorado Springs, CO (US)

(72) Inventor: Christopher Paul Gorog, Pueblo, CO (US)

(73) Assignee: BLOCKFRAME, INC., Colorado Springs, CO (US)

( * ) Notice: Subject to any disclaimer, the term of this patent is extended or adjusted under 35 U.S.C. 154(b) by 196 days.

(21) Appl. No.: 17/488,655

(22) Filed: Sep. 29, 2021

(65) Prior Publication Data

US 2022/0108028 A1    Apr. 7, 2022

Related U.S. Application Data

(60) Provisional application No. 63/086,904, filed on Oct. 2, 2020, provisional application No. 63/086,925, filed
(Continued)

(51) Int. Cl.
*G06F 21/60* (2013.01)
*H04L 9/08* (2006.01)
(Continued)

(52) U.S. Cl.
CPC ........ *G06F 21/602* (2013.01); *G06F 16/2379* (2019.01); *G06F 21/604* (2013.01);
(Continued)

(58) Field of Classification Search
CPC .............. G06F 21/602; G06F 16/2379; G06F 21/6209; G06Q 10/0835; G06Q 10/087;
(Continued)

(56) References Cited

U.S. PATENT DOCUMENTS 10,783,590 B1    9/2020  Zhou
11,138,602 B2    10/2021 Lu
(Continued)

FOREIGN PATENT DOCUMENTS

CA         3061603 A1      5/2020
WO      2019081919 A1      5/2019
(Continued)

OTHER PUBLICATIONS

PCT Notification of Transmittal of The International Search Report and The Written Opinion of The International Searching Authority for PCT Application No. PCT/US21/52854, dated Dec. 29, 2021.
(Continued)

*Primary Examiner* — Darshan I Dhruv
(74) *Attorney, Agent, or Firm* — Lowenstein Sandler LLP

(57) ABSTRACT

A system includes a memory device and a processor, operatively coupled to the memory device, to perform operations including receiving a request to provide a post-secrets-provisioning service with respect to a device, in response to receiving the request, determining whether to authorize the request, in response to authorizing the request, obtaining a set of secrets data corresponding to the device, and providing the post-secrets-provisioning service by performing a cryptographic function utilizing the set of secrets data.

19 Claims, 7 Drawing Sheets

Related U.S. Application Data on Oct. 2, 2020, provisional application No. 63/086,926, filed on Oct. 2, 2020, provisional application No. 63/086,928, filed on Oct. 2, 2020, provisional application No. 63/123,067, filed on Dec. 9, 2020.

(51) Int. Cl.

| | |
|---|---|
| *G06F 21/62* | (2013.01) |
| *G06Q 10/08* | (2023.01) |
| *G06Q 10/087* | (2023.01) |
| *G06Q 10/0835* | (2023.01) |
| *H04L 9/40* | (2022.01) |
| *G06F 16/23* | (2019.01) |
| *G06Q 20/38* | (2012.01) |
| *G06Q 20/40* | (2012.01) |

(52) U.S. Cl.
CPC ....... *G06F 21/6209* (2013.01); *G06Q 10/087* (2013.01); *G06Q 10/0835* (2013.01); *G06Q 20/389* (2013.01); *G06Q 20/401* (2013.01); *H04L 9/085* (2013.01); *H04L 9/0827* (2013.01); *H04L 9/0861* (2013.01); *H04L 9/0877* (2013.01); *H04L 63/0442* (2013.01); *H04L 63/0823* (2013.01); *H04L 63/0838* (2013.01)

(58) Field of Classification Search
CPC .... G06Q 20/389; G06Q 20/401; H04L 9/085; H04L 9/0861; H04L 9/0877; H04L 9/30; H04L 63/0442; H04L 63/0823; H04L 63/0838

See application file for complete search history.

(56) References Cited

U.S. PATENT DOCUMENTS

| | | | |
|---|---|---|---|
| 11,232,221 B2 | 1/2022 | Novotny | |
| 11,310,311 B2 | 4/2022 | Shrinivasan | |
| 2010/0125670 A1* | 5/2010 | Dondeti | H04L 67/104 709/229 |
| 2013/0151317 A1* | 6/2013 | Charfi | G06Q 30/0201 705/7.36 |
| 2016/0366111 A1 | 12/2016 | Smith et al. | |
| 2018/0041484 A1 | 2/2018 | Gifford et al. | |
| 2018/0130158 A1* | 5/2018 | Atkinson | G06F 21/6209 |
| 2018/0254898 A1* | 9/2018 | Sprague | H04L 9/0637 |
| 2018/0316492 A1* | 11/2018 | Ramachandran | H04L 9/0631 |
| 2019/0132410 A1 | 5/2019 | Kuzkin et al. | |
| 2019/0164137 A1* | 5/2019 | Vincent | H04L 9/0643 |
| 2019/0349426 A1 | 11/2019 | Smith et al. | |
| 2019/0354968 A1 | 11/2019 | Sato | |
| 2019/0370250 A1 | 12/2019 | Tipton et al. | |
| 2020/0067907 A1* | 2/2020 | Avetisov | H04L 63/12 |
| 2020/0074415 A1* | 3/2020 | Jayaram | G06Q 20/389 |
| 2020/0097927 A1* | 3/2020 | Groarke | G06Q 20/3829 |
| 2020/0119904 A1 | 4/2020 | Philyaw | |
| 2020/0120079 A1 | 4/2020 | Callaghan | |
| 2020/0142979 A1* | 5/2020 | Nakamura | G06F 16/27 |
| 2020/0242249 A1* | 7/2020 | Kumar | H04L 9/3297 |
| 2020/0320207 A1 | 10/2020 | Beno | |
| 2020/0403805 A1* | 12/2020 | Steele | H04L 9/3242 |
| 2021/0081557 A1 | 3/2021 | Thomson-Wood | |
| 2021/0382831 A1* | 12/2021 | Sun | H04L 9/3239 |

FOREIGN PATENT DOCUMENTS

| | | | | |
|---|---|---|---|---|
| WO | WO-2019175878 A1 | * | 9/2019 | ........... G01N 23/223 |
| WO | WO-2020001996 A1 | * | 1/2020 | ............ G06F 21/64 |
| WO | 2022016280 A1 | | 1/2022 | |

OTHER PUBLICATIONS

PCT Notification of Transmittal of The International Search Report and The Written Opinion of The International Searching Authority for PCT Application No. PCT/US21/52865, dated Dec. 28, 2021.

PCT Notification of Transmittal of The International Search Report and The Written Opinion of The International Searching Authority for PCT Application No. PCT/US21/52839, dated Jan. 11, 2022.

PCT Notification of Transmittal of The International Search Report and The Written Pinion of The International Searching Authority for PCT Application No. PCT/US21/52872, dated Jan. 12, 2022.

USPTO, Office Action for U.S. Appl. No. 17/488,56, dated Apr. 26, 2023.

PCT Notification Concerning Transmittal of International Preliminary Report on Patentability for PCT Application No. PCT/US2021/052854, dated Apr. 13, 2023, 6 pages.

PCT Notification Concerning Transmittal of International Preliminary Report on Patentability for PCT Application No. PCT/US2021/052865, dated Apr. 13, 2023, 11 pages.

PCT Notification Concerning Transmittal of International Preliminary Report on Patentability for PCT Application No. PCT/US2021/052839, dated Apr. 13, 2023, 10 pages.

PCT Notification Concerning Transmittal of International Preliminary Report on Patentability for PCT Application No. PCT/US2021/052872, dated Apr. 13, 2023, 9 pages.

* cited by examiner

PROVIDING CRYPTOGRAPHICALLY SECURE POST-SECRETS-PROVISIONING SERVICES

RELATED APPLICATIONS

The present Application claims priority to Provisional U.S. Patent Application No. 63/086,904, filed on Oct. 2, 2020 and entitled "BLOCKCHAIN SYNCHRONOUS TRUST CONSENSUS MODEL," Provisional U.S. Patent Application No. 63/086,925, filed on Oct. 2, 2020 and entitled "SECURITY MANAGEMENT FRAMEWORK FOR SUPPLY CHAIN FOR ENERGY DELIVERY SYSTEMS," Provisional U.S. Patent Application No. 63/086,926, filed on Oct. 2, 2020 and entitled "ADVANCED SECURITY MODEL BASED ON HYBRID BLOCKCHAIN AND CRYPTOGRAPHIC TRUST CHAIN ARCHITECTURE," Provisional U.S. Patent Application No. 63/086,928, filed on Oct. 2, 2020 and entitled "OPERATIONS AND USAGE OF CTC AND EMBEDDED LIBRARIES FOR ENABLING ADVANCED SECURITY MODEL," and Provisional U.S. Patent Application No. 63/123,067, filed on Dec. 9, 2020 and entitled "CYBER SECURITY ECOSYSTEM FOR SUPPLY CHAIN ORGANIZATION," which are incorporated herein by reference in their entirety for all purposes.

TECHNICAL FIELD

Embodiments of the disclosure relate generally to cybersecurity, and more specifically, relate to providing cryptographically secure post-secrets-provisioning services.

BACKGROUND

The Internet of Things (IoT) refers to a network of physical objects ("things") that are capable of communicating with each other and/or with other devices over the Internet. Industrial IoT (IIoT) devices can receive and analyze data received from connected equipment, operational technology, etc. to monitor and/or control industrial systems. An industrial control system (ICS) is an integrated hardware/software system that controls the operation of equipment (e.g., machines) within an environment.

SUMMARY

In some embodiments, a system is provided. The system includes a memory device and a processor, operatively coupled to the memory device, to perform operations including receiving a request to provide a post-secrets-provisioning service with respect to a device, in response to receiving the request, determining whether to authorize the request, in response to authorizing the request, obtaining a set of secrets data corresponding to the device, and providing the post-secrets-provisioning service by performing a cryptographic function utilizing the set of secrets data.

In some embodiments, a method is provided. The method includes receiving, from an entity by a processor of a secrets and service provider system, a request to provide a post-secrets-provisioning service with respect to a device, in response to receiving the request, determining, by the processor, whether to authorize the request, in response to authorizing the request, obtaining, by the processor, a set of secrets data corresponding to the device, and performing, by the processor, a cryptographic function utilizing the set of secrets data to provide the post-secrets provisioning service.

In some embodiments, a non-transitory computer-readable storage medium is provided. The non-transitory computer-readable storage medium includes instructions that, when executed by a processing device, cause the processing device to perform operations including receiving, from an entity, a request to provide a post-secrets-provisioning service with respect to a device. The post-secrets-provisioning service includes at least one of: a data or trust verification service, a data production service, a file authorization service, or a service to locate a secrets and service provider system to handle the request. The operations further include in response to receiving the request, determining whether to authorize the request based on a proof of ownership of the device maintained on a distributed ledger, in response to authorizing the request, generating a set of secrets data using the distributed ledger, wherein the set of secrets data corresponds to a state of the device within a supply chain, and providing the post-secrets-provisioning service by performing a cryptographic function utilizing the set of secrets data.

Numerous other aspects and features are provided in accordance with these and other embodiments of the disclosure. Other features and aspects of embodiments of the disclosure will become more fully apparent from the following detailed description, the claims, and the accompanying drawings.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figures 1, 2:
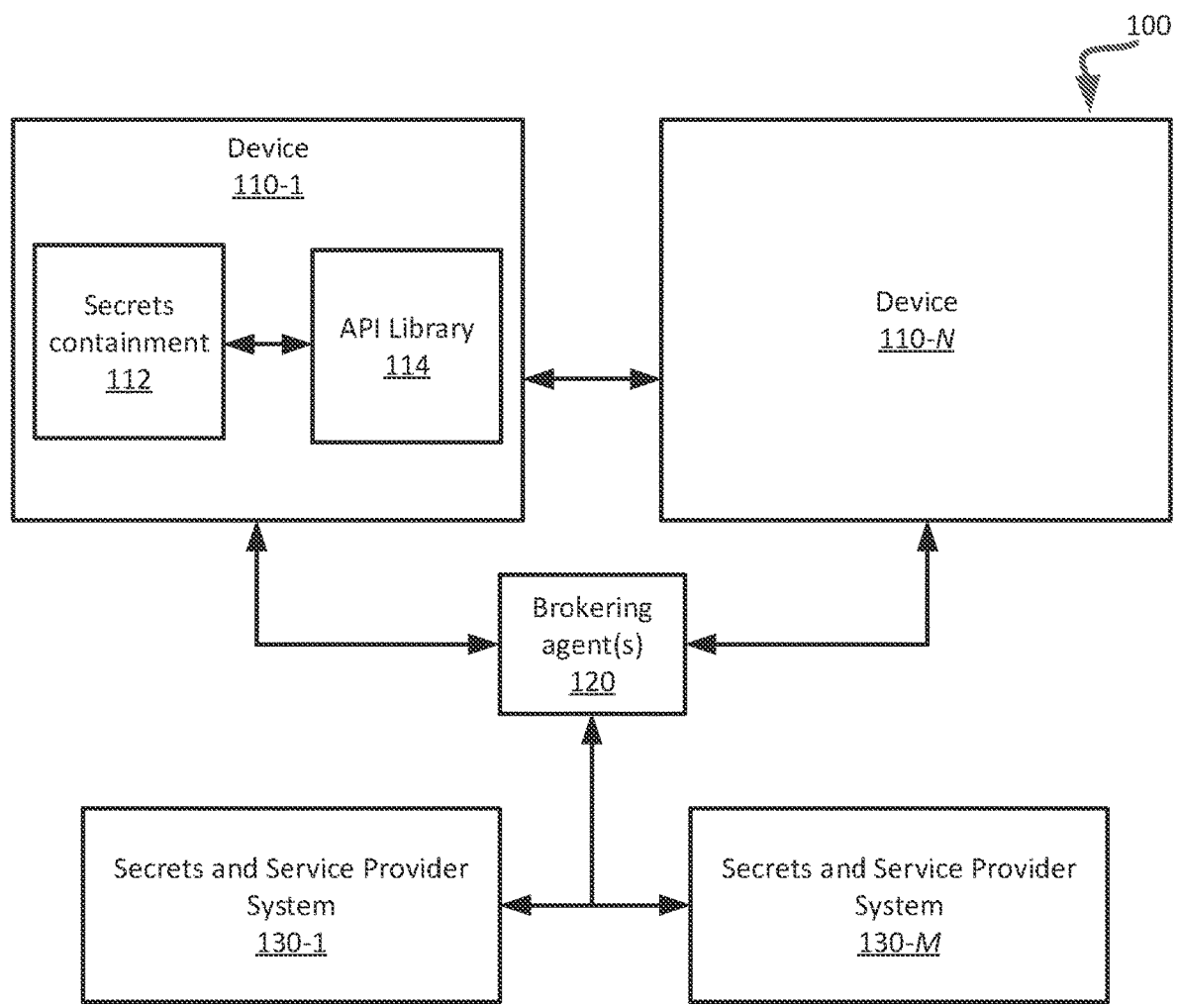
FIG. 1 is a block diagram of an example cybersecurity system, in accordance with some embodiments of the present disclosure.
FIG. 2 is a block diagram illustrating various sets of secrets data that can be inserted onto a cryptographic enabled trust device, in accordance with some embodiments of the present disclosure.

Aspects of the present disclosure are directed to cryptographic trust devices for enabling cybersecurity features. The modern supply chain may be dependent on trustworthy connections that render the Internet interoperable. However, a major challenge of the Internet today is ensuring trust among the various entities interacting within a system. Certain solutions for establishing trust among entities are generally bandage-like solutions and may not provide adequate protection. A network (e.g., industrial network) may not provide sufficient underlying trust in each device within the industrial network. For example, with respect to Internet of Things (IoT) devices, a uniform way does not exist to secure, identify and/or manage such IoT devices as the IoT devices are transferred among various entities throughout the supply chain lifecycle. An IoT device herein refers to an object that is embedded with technology (e.g., sensors, software) to connect and exchange information with other devices and/or systems over a communication network (e.g., Internet). Examples of IoT devices include smartphones, wearable devices (e.g., smartwatches, fitness trackers and medical sensors), voice-controlled digital assistants, etc.

Aspects of the present disclosure address the above and other deficiencies by implementing post-secrets-provisioning consumption as a service. A cryptographically secure device management system can include a secrets and service provider system and a cryptographic trust enabled device ("device"). For example, the device can be an IoT device. The secrets and service provider system can securely generate and provision a set of cryptographic secrets ("secrets data") for insertion onto a cryptographic trust enabled device ("device") upon request. More specifically, the set of secrets data can be maintained on the device within protected memory of a secrets containment component. The secrets and service provider system can be included within a system that communicates with one or more devices and/or one or more other secrets provisioning systems. Transactions performed with respect to the generation and/or provisioning of the set of secrets data can be maintained on a distributed ledger, or other suitable mechanism to ensure record immutability.

The set of secrets data can include a number of secrets components that enable the device to perform a variety of cryptographic functions while the device is in the particular state. For example, the set of secrets data can include a cryptographic key management block including a set of cryptographic key data for the particular state. In some embodiments, the set of secrets data is provided as a non-fungible token (NFT). The set of secrets can be placed on the device while the device is in a particular state. More specifically, the state can correspond to a certain segment of a supply chain in which the device is present. Examples of states include a manufacturer provisioning state in which the device is in possession of a manufacturer, a vendor provisioning state in which the device is in possession of a vendor, an end-use provisioning state in which the device is allocated to at least one end-use segment (e.g., within a network or as a standalone device that uses the end-use provisioning state for communication to resources), and an operational state in which the device is presently operating or functioning within the network. A vendor refers to an entity that can assemble, program and/or handle the physical disposition of a device. Each state can be used to control the insertion and visibility of a corresponding set of secrets data onto the device. For example, the device can maintain a set of vendor provisioning secrets data on protected memory while in the vendor provisioning state to enable the device to perform cryptographic functionality pertaining to the vendor provisioning state, but would be unable to access the set of vendor provisioning secrets data while in the manufacturer provisioning state.

From time to time, as the device progresses throughout the supply chain, the device may transfer possession/ownership between entities. To securely provision secrets at each stage of the supply chain as possession/ownership is transferred, the secrets and service provider system can participate in a process to transition the device from a first state to a second state (e.g., to elevate the device from a current state to a subsequent state, or revert the device from the current state to a previous state). The state transition process is a cryptographically secure process that enables the device to insert a set of secrets data for the second state. The device can maintain a state machine that maintains the state of the device. For example, the state machine can be maintained on the secrets containment component.

The secrets and service provider system can interact with the device to provision the set of secrets data during state transition. To further ensure data integrity and security during the state transition process, a brokering agent can be employed to broker the operations performed between the device and the secrets and service provider system. The brokering agent is a verified trusted entity (e.g., third-party entity) that functions as a proxy between the device and the secrets and service provider system to support cryptographically secure communications via a three-way handshake between the brokering agent, the device and the secrets and service provider system. More specifically, the secrets and service provider system can receive a request from a brokering agent to provide the encrypted version of the set of secrets data for the state transition, the secrets and service provider system can provide the encrypted version of the set of secrets data to the brokering agent for insertion on the device. There can be a number of separate brokering agents that are each responsible for a device while in a particular state. For example, there can be a manufacturing brokering agent, a vendor brokering agent, an end-use brokering agent, an operational brokering agent, etc. To protect other sets of secrets data from extraction after a state transition, the device can cryptographically seal ("seal") the previous set of secrets data corresponding to the previous state by encrypting the previous set of secrets data with a particular encryption key so that it is not obtainable by the entity now in possession of the device. Alternatively, the previous set of secrets data can be deleted after a successful state transition. Accordingly, risk for handling of secrets data at each stage within the supply chain can be deferred to entities that are able to handle and offset such risk, which can enable distributed manufacturing in regions where subcontractors may not be trusted to handle secrets and/or software/firmware component.

The secrets and service provider system can generate a set of secrets data, encrypt the set of secrets data to obtain an encrypted version of the set of secrets data, and maintain the encrypted version of the set of secrets data on encrypted storage. Each set of secrets data can include a number of secrets components. To provide an extra layer of encryption, each of the secrets components can themselves be independently and uniquely encrypted by a respective cryptographic key, and then the entire set of secrets data can be encrypted (e.g., wrapped) to obtain the encrypted version of the set of secrets data. More specifically, a set of secrets data can be generated from a first set of data. The first set of data can include secret data of the secrets and service provider system, public data (e.g., public information provided by a brokering agent), secret device-specific data (e.g., secret device-specific information provided by a brokering agent), and secret organizational data (e.g., secret organization information provided by a brokering agent). For example, the public data, secret device-specific data and/or the secret organization data can be provided via a user interface (e.g., a webpage, a handheld device, a mobile device application). Each type of data can be obfuscated and encapsulated to be verifiable on insertion, and each type of data can be independently and uniquely encrypted by a secrets generator of the secrets and service provider system to generate the set of secrets data. The set of secrets data can then be encrypted by the secrets generator, using a second set of data derived from the secrets generator, to obtain the encrypted version of the set of secrets data. The encrypted version of the set of secrets data can then be ready for transport and storage on a distributed ledger linked to a brokering agent.

After the secrets and service provider system provisions a set of secrets data onto a device, the secrets and service provider system has ownership of the device. Record of the ownership of the device can be maintained in the distributed ledger, along with the secrets data that has been provisioned with the device. With such ownership, the secrets and service provider system can offer one or more cryptographically secure post-secrets-provisioning services (e.g., web services), referred to as consumption as a service. The secrets and service provider system can provide a post-secrets-provisioning service related to a particular device by utilizing a set of secrets data that has (or had been) inserted into the device during secrets provisioning, which can enable the secrets and service provider system to emulate the cryptographic functionality of the device.

Post-secrets-provisioning services can be offered with respect to a large number of use cases. Examples of use cases include data analytics, supply chain security, credential tracking, cybersecurity, forensic tracking and accountability, sensitive or confidential data maintenance or exchange (e.g., intellectual property, private corporate information, confidential or top secret government information), property record maintenance, fraud and waste prevention, audit processes, governance programs, record or tracking and verification, smart contracts, supply chain and product tracking, banking, cryptocurrency, etc. After a post-secrets-provisioning service is provided by the secrets and service provider system, a record of the post-secrets-provisioning service can be placed on a distributed ledger. The record can include a data payload, a timestamp, an identifier of the entity that requested the post-secrets-provisioning service ("requestor"), and the type of post-secrets-provisioning service that was provided.

One example of a post-secrets-provisioning service that can be offered by the secrets and service provider system is an on-demand data and/or trust verification service ("verification service"). The verification service can be used to verify the proof of origin of data upon request. For example, the verification service can be used to verify a prior device configuration.

Another example of a post-secrets-provisioning service that can be offered by the secrets and service provider system is on-demand data production. The data production service can be used to generate data for a device upon request as if it was the device by recreating secrets data. One type of data production service is a data recovery service to recover data that has been lost by the device, such as data that had been encrypted with a previous set of secrets data that is sealed within the device, by having the secrets and service provider system recreate the previous set of secrets data using information maintained on the distributed ledger and/or secrets generator. Another type of data production service is a data access service. The data access service can enable secure access to sensitive data (e.g., sensitive files), which can be subject to a limited use and/or temporal scope for data privacy. For example, the secrets and service provider system can provide an authorized entity (e.g., upon request from the authorized entity) with a set of secrets data for decrypting an encrypted version of data. The set of secrets data can be designed to be valid only during a defined time period to prevent unlimited access to the data, such that the entity will not be able to decrypt the encrypted version of the data outside of the time period.

Another example of a post-secrets-provisioning service that can be offered by the secrets and service provider system is an on-demand file authorization service. The file authorization service is used to authorize a file upon request. To do so, the secrets and service provider system can generate, using a set of secrets data, an authorization packet including an encrypted version of a file, and send the authorization packet to the device. The authorization packet enables the device to determine whether the encrypted version of the file is valid for decryption by the device. Examples of files that can be authorized using the file authorization service include a document, an application, a consumable data packet, etc.

Another example of a post-secrets-provisioning service that can be offered by the secrets and service provider system is an on-demand installation authorization service. The installation authorization service can be provided by the secrets and service provider system upon request to determine whether to authorize the installation of an application on a device. For example, the installation authorization service can be provided by the secrets and service provider system upon request to determine whether the installation of an application by a vendor while the device is in a vendor provisioning state. In this example, the authorization packet used to determine whether to allow the installation of the application by the vendor can be generated using vendor-generated secrets data, instead of the secrets and service provider system.

Another example of a post-secrets-provisioning service that can be offered by the secrets and service provider system is an on-demand secrets and service provider locator service. The secrets and service provider locator service is a service that, upon receiving a request from a requesting device that a secrets and service provider system is not authorized to handle, locates an authorized secrets and service provider system within the network to handle the request. For example, if a secrets and service provider system does not have ownership over the requesting device (e.g., it did not provisioning the corresponding set of secrets data onto the device, and thus cannot be authorized to mimic the device to handle the request), the secrets and service provider system can contact other secrets and service provider systems within the network to determine an authorized secrets and service provider system to handle the request (e.g., the secrets and service provider system that had provisioned the set of secret data onto the device). Further details regarding these post-secrets-provisioning services will be described below.

Advantages of the present disclosure include, but are not limited to, uniform secrets provisioning on IoT devices, uniform formatting for cryptographic functions across multiple devices, uniform resetting and/or refactoring of security by deriving and re-provisioning secrets, and improved cybersecurity.

FIG. 1 is a block diagram of an example cybersecurity system ("system") 100 for in accordance with some embodiments of the present disclosure. In some embodiments, the system 100 is an IoT and/or ICS system. As will be described in further detail, the system 100 can implement cybersecurity functionality, including producing uniform security features, synchronize supply chain assets globally, enable cross-industry support, relate processes and visibility of business operations, uniquely link data to sources, enabling tracking and confidential access, etc. All devices in a given end-use segment (for example, a section of smart grid or the computers in a single business) can contain a shared network secret. The shared network secret can be leveraged to generate symmetric keys synchronized across the network, which are in turn used for encryption and message authentication.

As shown, the system 100 can include a number of distributed cryptographic enabled trust devices ("devices") 110-1 through 110-N, set of brokering agents 120, and a number of secrets and service provider systems 130-1 through 130-M. In some embodiments, the devices 110-1 through 110-N include IoT devices and the system 100 can be an IoT system. As will be described in further detail herein, the system 100 can be used to implement supply chain trust management with respect to the devices 110-1 through 110-N. That is, the system 100 can provide "Supply Chain Consumption as a Service" including cryptographic key management to provide separation of functional implementation of private secret programming with respect to each level of the supply chain. For example, the cryptographic key management block for a device can support trust progression throughout the entire lifecycle of the device in a supply chain by supporting cascading trust across all entities (e.g., organizations, companies and/or individuals) which handle manufacturing, vendor, end-use, operational, and end of life (EOL) stages for a device. Each stage of the supply chain (e.g., manufacturing, vendor, end-use, operational, and end-of-life) can correspond to a state of the device.

Each of the devices 110-1 through 110-N can include a secrets containment component to process and maintain secrets data, and an application programming interface (API) library for implementing API methods for establishing cryptographic secure communications with other entities within the system 100. For example, the device 110-1 includes a secrets containment component 112 and an API library 114. The secrets containment component 112 can include a cryptographically-protected memory. The cryptographically-protected memory can be located on a protected integrated circuit, such as a hardened System-on-Chip (SoC), a secure microprocessor, etc.

For example, with respect to the device 110-1, the set of secrets data can corresponding to some state of the device 110-1. In some embodiments, the set of secrets is embodied as a non-fungible token (NFT). More specifically, the state can correspond to a certain segment of a supply chain in which the device is present. Examples of states include a manufacturer provisioning state, a vendor provisioning state, an end-use provisioning state, and an operational state. Each state can be used to control the insertion of a corresponding set of secrets onto the device, such that the insertion of the set of secrets for a particular state places the device in the particular state.

The set of secrets data can include a cryptographic key management block including a number of cryptographic key components to perform a cryptographic function while in the particular state. Cryptographic key management generally refers to the handling, protection, canceling/revocation, transporting or logistical coordination of the cryptographic keys. For example, the device can maintain a set of vendor provisioning secrets data in protected memory while in the vendor provisioning state, but would be unable to access the set of vendor provisioning secrets data while in the manufacturer provisioning state. Each of the devices 110-1 through 110-N can maintain a state machine that can track state progressions of the device, which can enable the provisioning of the device with the appropriate set of components for the particular state. Further details regarding the cryptographic key management block will be described below with reference to FIG. 2.

Each of the secrets and service provider systems 130-1 through 130-M can securely generate and maintain sets of secrets data to be inserted onto at least one of the devices 110-1 through 110-N. Each of the secrets and service provider systems 130-1 through 130-M can be associated with a particular stage of the supply chain. More specifically, one of the secrets and service provider systems 130-1 through 130-M can be a vendor secrets and service provider system, another of the secrets and service provider systems 130-1 through 130-M can be an end-use secrets and service provider system, etc. For example, the vendor secrets and service provider system would be responsible for the set of vendor provisioning secrets data. Any packet created by a secrets and service provider system can be reproduced to enable cross-IUR support.

As will be described in further detail below with reference to FIG. 3, the secrets and service provider system 130-1 can include a secrets generator, encrypted storage, and a distributed ledger system. The secrets generator can securely generate an encrypted version of a set of secrets data, and securely store the encrypted version of the set of secrets of data on the encrypted storage so that it is never obtainable or visible for interception by outside entities. To provide an extra layer of encryption, each of the base components used to generate the set of secrets data can themselves be independently and uniquely encrypted by a respective cryptographic key, and then the entire set of secrets data can be encrypted to obtain the encrypted set of secrets data. The secrets generator can perform encryption/decryption to enable cryptographic functions (e.g., digital signatures) performed by the secrets and service provider system 130-1, and can be embodied as hardware and/or software. In some embodiments, the secrets generator is embodied as a hardware security module (HSM). An HSM is a tamper-resistant computing device that can securely generate and/or manage secrets data (e.g., cryptographic keys).

Each of the secrets and service provider systems 130-1 through 130-M can be used as part of a process to control the provisioning/insertion of sets of secrets data onto the devices 110-1 through 110-N in a manner that maintains data integrity and trust. Provisioning is the process of requesting and inserting keys and a certificate into a device (or emulator). The provisioned set of secrets data can be used to implement cryptographic functionality, as will be described in further detail below. For example, the set of secrets data can include at least one of a cryptographic key for performing encryption during a cryptographic function, a digital certificate for proving ownership of a public key during a cryptographic function, etc. Illustratively, assume that device 110-1 is presently in a first state corresponding to a first segment of the supply chain, but the device 110-1 is now in a second segment of the supply chain. The device 110-1 can then undergo a state transition process to transition the device 110-1 to a second state corresponding to the second segment of the supply chain (e.g., to elevate the device from a current state to a subsequent state, or revert the device from the current state to a previous state). The state transition process is a cryptographically secure process that grants the device 110-1 access to the second set of secrets data. For example, the first state can be a manufacturer provisioning state and the second state can be a vendor provisioning state. As another example, the first state can be the vendor provisioning state and the second state can be an end-use provisioning state. As another example, the first state can be the end-use provisioning state and the second state can be an operational state. However, such examples should not be considered limiting.

For example, during a manufacturing stage of the supply chain for the device 110-1, the device 110-1 can be initially programmed by a corresponding manufacturer to securely manage the cryptographic keys in the device. More specifically, the device 110-1 can have a unique manufacturer-assigned identifier that enables tracking of the device throughout the supply chain. The identification scheme used by a manufacturer can be maintained as a private manufacturer secret to prevent cyber-attacks within the system 100. During the vendor stage of the supply chain, the device 110-1 can then be transferred between one or more vendors. During the end-use state of the supply chain, the device 110-1 can be assigned to one or more end-use segments. During the operation state of the supply chain, the device 110-1 can be placed into an operational state.

To undergo the state transition process, the device 110-1 can receive the encrypted version of the set of secrets data for the second state from the secrets and service provider system 130, and transition to the second state upon receipt of the encrypted version of the set of secrets data. To provide a layer of cryptographic security, the device 110-1 and the secrets and service provider system 130 are not placed in direct communication. To enable such indirect communication, a brokering agent of the set of brokering agents 120 can be employed to securely broker the transaction between the device 110-1 and the secrets and service provider system 130. The set of brokering agents 120 can include a number of separate brokering agents that are each responsible for a device. For example, there can be a manufacturing brokering agent, a vendor brokering agent, an end-use brokering agent, etc. Each brokering agent is a certified third party entity that functions as a broker or proxy between the device 110-1 and the secrets and service provider system 130 to support cryptographically secure communications via a three-way handshake between the brokering agent 120, the device 110-1 and the secrets and service provider system 130. For example, a brokering agent of the set of brokering agents 120 can be included as a web service. A brokering agent of the set of brokering agents 120 can be licensed to a third-party within the system 100 to provide individualized brokering services within the system 100.

For example, the brokering agent can issue a request to the secrets and service provider system 130, on behalf of the device 110-1, to transition the device to the second state (e.g., elevate to or revert back to the second state). In response, the secrets and service provider system 130 can issue a challenge package to the brokering agent in order to authenticate the brokering agent as being a valid brokering agent to handle the request on behalf of the device. For example, the challenge can be based on an internal secret of the device 110-1 that only an authorized entity, such as the brokering agent, would have knowledge of. The brokering agent can provide a response back to the secrets and service provider system 130. If the response does not authenticate the brokering agent, then the brokering agent cannot be trusted and the process ends. If the response authenticates the brokering agent, then the secrets and service provider system 130 can provide a response that places the device in a state for transitioning to the second state. Then, the brokering agent can issue a request to the secrets and service provider system 130 for the encrypted version of the set of secrets data to be inserted into the device 110-1 for transitioning to the second state. The secrets and service provider system 130 can then provide the encrypted version of the set of secrets data to the brokering agent 120, which then forwards the encrypted version of the set of secrets data to the device 110-1 for secure storage on the device 110-1.

However, before the set of secrets data can be stored in the protected memory of the secrets containment component 112 for use, the device 110-1 first needs to be granted permission transition to the target state. In some embodiments, the device 110-1 can enter a supersession state, in which the device generates a supersession package. The supersession package is a set of data that is used to determine whether the device 110-1 has authority to supersede or overwrite a current set of secrets data corresponding to the current state of the device 110-1 with the set of secrets data corresponding to the target state. The supersession package can be forwarded to the secrets and service provider system 130 via the brokering agent. In response to determining that the device 110-1 has permission to transition to the target state (e.g., determining that supersession package is valid), the secrets and service provider system 130 can notify the device 110-1 that it has permission to transition to the target state. In some embodiments, the secrets and service provider system 130 can send a commit package to the device 110-1 via the brokering agent. The commit package is a set of data that is generated by the secrets and service provider system 130 as a response that confirms that the device has authority to supersede or overwrite the current set of secrets data with the set of secrets data corresponding to the target state. To prevent replay attacks and to ensure that the provisioning steps are called in order during a single session, one or more of the packages generated by the device 110-1 and/or the secrets and service provider system 130 can be generated based on content of the previously generated packages.

Storing the set of secrets data can include obtaining a decrypted version of the set of secrets data (e.g., locally decrypting the encrypted version of the set of secrets data), storing the decrypted version of the set of secrets data in the protected memory of the secrets containment component 112, cryptographically sealing the previous set of secrets data of the prior state, and updating a state maintained by a state machine to reflect the transition to the target state. Obtaining the decrypted version of the set of secrets data can include locally decrypting the encrypted version of the set of secrets data. For example, the keys needed to perform the decryption can be made available to the device 110-1 upon successful transition to the target state. Updating the state can include incrementing a programming sequence count with respect the state machine. Accordingly, the device 110-1 can be securely programmed by entities which possess its internal secret, and control of the device 110-1 can be securely transferred to entities as ownership of the device 110-1 is transferred between the entities throughout the supply chain lifecycle.

As will be described in further detail below with reference to FIG. 3, the secrets and service provider system 130 can store transaction data on a distributed ledger system. The distributed ledger system can maintain transactions relating to, e.g., entry of a device/chip with an identifier to the system 100, provisioning of secrets on devices, requests for restricted information from entities external to the system 100, registration of valid brokering agents, installation of registered software and/or software updates, transfer of device ownership (e.g., responsible party), registering network affiliations, and regression, resetting, removal or end-of-life of a device at any stage. For example, the secrets and service provider system 130 can provide record of the completed state transition on the distributed ledger system. The immutable storage of the transaction data on the distributed ledger system ensures legitimacy and authenticity of the encrypted provisioning data. Accordingly, the distributed ledger system can provide verifiable trust and support proof of origin for all transactions performed by the secrets and service provider system 130 within the system 100.

The API library of each of the devices 110-1 through 110-N (e.g., API library 114) can function to provide secure communications between other ones of the devices 110-1 through 110-N and/or the secrets and service provider systems 130-1 through 130-M For example, each API library (e.g., .so or .dll) can maintain a set of APIs to implement various services using a set of secrets corresponding to the particular one of the devices 110-1 through 110-N. A secrets and service provider system (e.g., the secrets and service provider system 130-1) can recreate the API library for a device as necessary to provide a post-secrets-provisioning service (e.g., data verification, data production, file authorization, application authorization). Further details regarding these post-secrets-provisioning services will be described below with reference to FIGS. 3-7.

FIG. 2 is a diagram 200 illustrating various types of sets of secrets data, in accordance with some embodiments. Each set of secrets data can be provisioned on a device (e.g., IoT device) can include a cryptographic key management block to enable cybersecurity features during a corresponding device state. For example, the device state can correspond to a stage within the supply chain lifecycle of the device. For example, the diagram 200 shows of a set of manufacturer provisioning secrets data 210 that can be provisioned on a device during a manufacturing stage of the device in the supply chain, a set of vendor provisioning secrets 220 that can be provisioned on the device during a vendor stage of the device in the supply chain, a set of end-use provisioning secrets data 230 that can be provisioned on the device during a end-use stage of the device in the supply chain, a set of operational secrets data 240 that can be provisioned on the device during an operation stage of the device within the supply chain, a set of end-of-life secrets provisioning data 250. In some embodiments, each of the sets of secrets data 210-250 can be embodied as an NFT. Moreover, each of the sets of secrets data 210-250 can be recorded on a distributed ledger of a secrets and service provider system for immutability.

The set of manufacturer provisioning secrets data 210 can include original manufacturer secrets that can be placed on the device directly by the manufacturer. For example, the set of manufacturer provisioning secrets data 210 can include a device identifier associated with the manufacturer (UID), and a provisioning transport key. The provisioning transport key, which can also be referred to as a key wrapping key or a key encryption key, is used to wrap a secret key to maintain confidentiality and authenticity during transportation of the secret key. The provisioning transport key can also be used for authentication and transport of a device's new privacy and boot verification secrets during vendor state reprogramming. For example, the provisioning transport key can hold a lot number between manufacturing and assignment to the device's first vendor. During a state progression of the device from the manufacturer state to the vendor state, the secrets and service provider system (e.g., the secrets and service provider system 130) can take ownership and overwrite the provisioning transport key of the set of manufacturer provisioning secrets data 210 to become a (primary) supply chain registrar.

The set of vendor provisioning secrets data 220 can include cryptographic data components specific to a vendor that is in possession of the device. When transitioning to the vendor provisioning state, the original manufacturer secrets are overwritten with the set of vendor provisioning secrets data. If the control of the device is being transferred from an old vendor to a new vendor, the set of old vendor provisioning secrets data is replaced by the set of new vendor provisioning secrets data, and the set of old vendor provisioning secrets data is maintained on the distributed ledger. The set of vendor provisioning secrets data 220 can include cryptographic data components such as a vendor certificate (e.g., vendor signed certificate), a set of private keys (e.g., private signing key and private encryption key), a vendor configuration, etc.

The set of end-use provisioning secrets data 230 can include cryptographic data components that can be linked to a particular network or product line, and can support cryptographic communications, trust root, and extended security/privacy features for physical security and logical data operations. For example, the set of end-use provisioning secrets data 230 can include a network certificate (e.g., certificate authority (CA) signed), a network exchange key for securely exchanging keys over a public network (e.g., Diffie-Hellman network exchange key), and symmetric secrets (e.g., network segment global secret, network sub-segment secrets, an authentication key, a privacy secret, and network segment derivation data). For example, if a new network is reprogrammed while the device is in the end-use provisioning state, the new network can be added to the device along with the old networks. The device can maintain a certain number of networks based on device memory specifications.

The operational state can enable generation of derived use secrets and ephemeral use (e.g., one-time use) keys during device operation. The set of operational secrets data 240 can be utilized for extending and augmenting operations performed by the device by creating derived or temporary use components. For example, the set of operational secrets data 240 can include a derived network secret, a network operation secret, a roll network key, and network segment derivation data (e.g., derivation timing, key supersession, roll number, key exchange timestamp). The set of operational secrets data 240 can be re-provisioned when adding another network segment, or replacing a compromised network segment.

The set of end-of-life provisioning secrets data 250 can support the removal of the device from the supply chain, and can provide solutions similar to certificate revocation with the expanded revocation of right-to-operate or removal of trusted status. The set of end-of-life provisioning secrets data 250 can include modified versions of the cryptographic components 210-240. In alternative embodiments, the set of end-of-life provisioning secrets data 250 can be provisioned separately from the device, such that the device does not store the set of end-of-life provisioning secrets data 250 locally on its protected memory. A device cannot be forced into end-of-life, but other entities within the system can be informed that the device should be treated as an end-of-life device.

Figure 3:
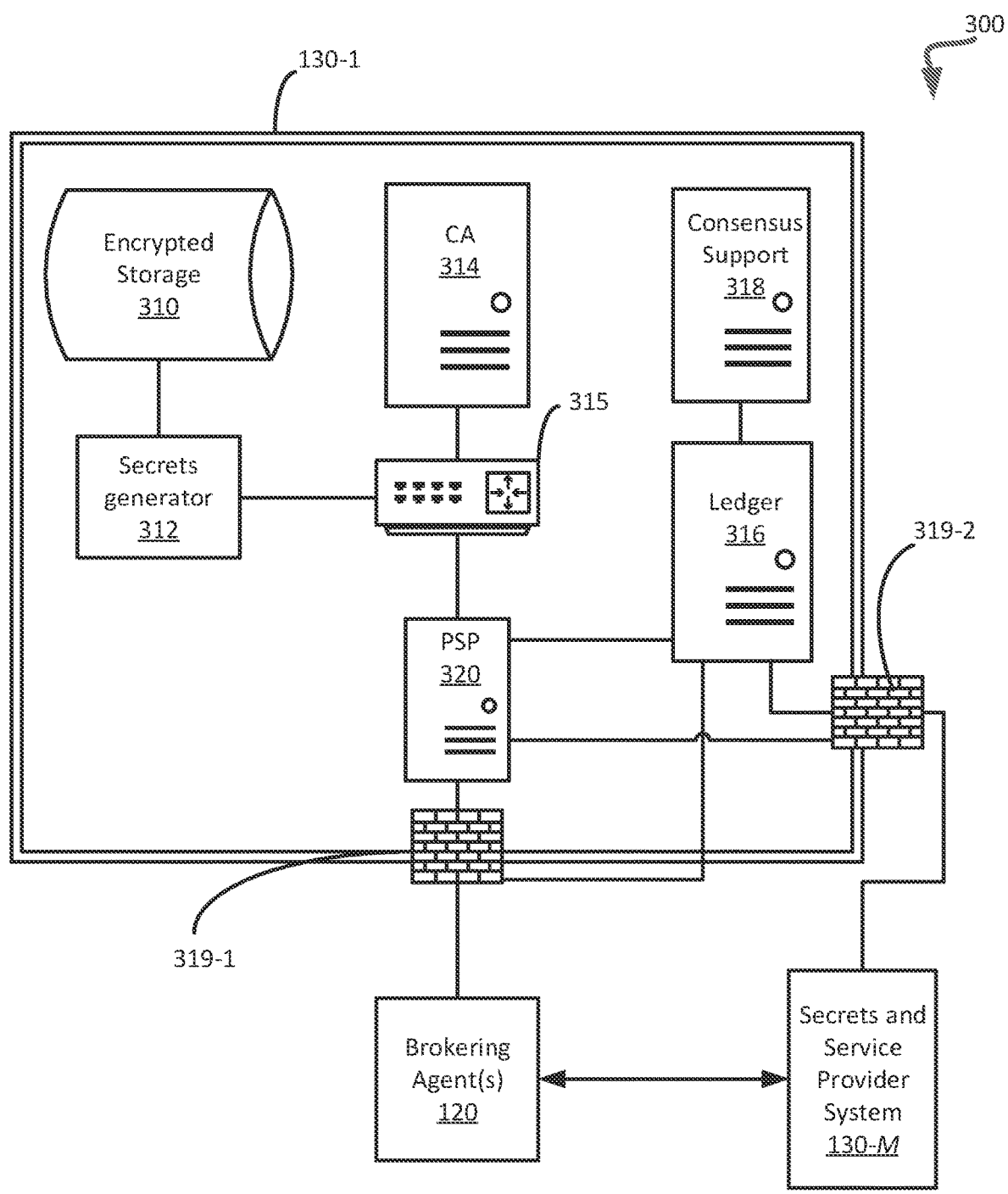
FIG. 3 is a block diagram of an example system including a secrets and service provider system, in accordance with some embodiments of the present disclosure.

FIG. 3 block diagram of an example system 300 for provisioning secrets data, in accordance with some embodiments of the present disclosure. The system 300 includes the secrets and service provider systems 130-1 through 130-M and the set of brokering agents 120, as described above with reference to FIG. 1. The design of the system 300 provides a separation of functionality between internal operations each of the secrets and service provider systems 130-1 through 130-M, and external operations with respect to other entities of the system 300.

For example, as shown, the secrets and service provider system 130-1 includes encrypted storage 310 (e.g., encrypted UID indexed logistics storage), a secrets generator 312 in communication with the encrypted storage 310, and a certificate authority (CA) 314 for maintaining a digital or public key certificate (e.g., X.509 certificate).

The secrets generator 312 can be embodied as a software secrets generator or a hardware secrets generator. In some embodiments, the secrets generator 312 includes a hardware security module (HSM). An HSM is a tamper-resistant computing device that can generate and/or manage cryptographic keys, and can perform encryption/decryption to enable cryptographic functions (e.g., digital signatures) performed by the secrets and service provider system 130-1. For example, when a cryptographic trust enabled device ("device") is progressing from a first state to a second state, the secrets generator 312 can transfer an encrypted version of the set of secrets data of a cryptographic key management block corresponding to the second state for insertion onto the device. For example, if the device transitions from a manufacturer provisioning state to a vendor provisioning state, the secrets generator 312 can transfer and program the corresponding set of vendor provisioning data of the cryptographic key management block. Additionally, the secrets generator 312 can recreate sets of secrets data for a device (e.g., the device 110-1 of FIG. 1) in order to enable the secrets and service provider system 130-1 to provide a service by emulating the device utilizing the set of secrets data.

The secrets and service provider system 130-1 can further include a distributed ledger ("ledger") platform 316 (e.g., server) in communication with a consensus support platform 318 (e.g., server), collectively forming a distributed ledger system. The distributed ledger platform 316 can maintain a public ledger of records, including records relating to the generation and/or provisioning of sets of secrets data. The consensus support platform 318 can implement a consensus mechanism or protocol. Other ones of the secrets and service provider systems 130-2 through 130-M include their own distributed ledger systems to maintain their own copies of the distributed ledger and implement the consensus mechanism (e.g., peer nodes of the distributed ledger network). The distributed ledger platform 316 can maintain records of transactions relating to, for example, entry of a device/device with an identifier, provisioning of secrets packages, requests for restricted information from entities external to the system 300, registration of valid brokering agents, installation of registered software and/or software updates, transfer of device ownership (e.g., responsible party), registering network affiliations, and regression, resetting, removal or end-of-life (EOL) of a device at any stage. The distributed ledger can be used to provide a service by emulating the device utilizing a set of secrets data corresponding to the device. For example, the secrets and service provider system 130-1 can receive information related to obtaining and/or recreating the set of secrets data from the distributed ledger, and can use the distributed ledger to prove ownership of the device for service provider authorization.

The secrets and service provider system 130-1 can further include a provisioning service provider (PSP) 320 in communication with the distributed ledger platform 316. The PSP 320 can communicate with the set of brokering agents 120 to provision sets of secrets data and/or provide post-secrets-provisioning services with respect to devices (e.g., the device 110-1 of FIG. 1). The secrets generator 312, the CA 314, and the PSP 320 are each in communication with a central routing device 315. The central routing device 315 can maintain minimal functionality for decisions and triggering flow of operations within the secrets and service provider system 130-1.

Access control interfaces 319-1 and 319-2 are also provided to allow or restrict access to the distributed ledger platform 316 and/or the PSP 320, respectively. That is, the access control interfaces 319-1 and 319-2 can function as firewalls for the secrets and service provider system 130-1. For example, the access control interface 319-1 can allow or restrict access to outside brokering agents, and the access control interface 319-2 can allow or restrict access to other secrets and service provider systems (e.g., secrets and service provider system 130-M).

The registration process for adding new brokering agents to the set of brokering agents 120 can be maintained and controlled by a distributed ledger consortium of the system 300. The distributed ledger consortium can address how the secrets and service provider systems 130-1 through 130-M can maintain trust for the set of brokering agents 120 and allow for cross-brokering-agent support.

A brokering agent of the set of brokering agents 120 can communicate with the PSP 320 to request a set of secrets data on behalf of a device (e.g., the device 110-1 of FIG. 1). For example, as described above with reference to FIG. 1, the secrets and service provider system 130-1 can authenticate the brokering agent (e.g., using a multi-factor authentication process). After the authorization process indicates that the brokering agent is authorized, the PSP 320 can initiate a timed API sequence to implement the service. That is, the brokering agent can function as trusted interface for the API method flow between the secrets and service provider system and the device. The secrets and service provider system 130-1 can then place a record of the transaction on the distributed ledger maintained by the distributed ledger platform 316. The record can include proof relating to the authentication of the brokering agent and the state of the device. Once the sequence is complete, the brokering agent can close out the session with the secrets and service provider system 130-1, and the brokering agent can cease communication with the device.

The system 300 can be used to support and control the progression of states of the device throughout the supply chain lifecycle of the device. For example, the secrets and service provider system 130-1 can maintain a log of the current state of the device using the distributed ledger platform 316 and map its state change progression within the encrypted storage 310. For example, the device can be in a manufacturer provisioning state corresponding to the manufacturing stage of the supply chain of the device, a vendor provisioning state corresponding to the vendor stage of the supply chain of the device, an end-use provisioning state corresponding to a end-use stage of the supply chain of the device, or an operational state corresponding to an operational stage of the supply chain of the device. The secrets and service provider system 130-1 can be used to control the provisioning of secrets onto the device, which can be used to transition ownership/accountability at each stage of the supply chain to the appropriate entity (e.g., manufacturer, vendor). For example, the secrets and service provider system 130-1 can transfer ownership/accountability of the device from an old vendor to a new vendor. As another example, when transitioning the device from the vendor stage to an end-use network, the secrets and service provider system 130-1 can seal, restrict and/or remove the corresponding set of vendor provisioning secrets data.

The system 300 can further be used to provide post-secrets-provisioning services. Post-secrets-provisioning services can be offered with respect to a large number of use cases. Examples of use cases include data analytics, supply chain security, credential tracking, cybersecurity, forensic tracking and accountability, sensitive or confidential data maintenance or exchange (e.g., intellectual property, private corporate information, confidential or top secret government information), property record maintenance, fraud and waste prevention, audit processes, governance programs, record or tracking and verification, smart contracts, supply chain and product tracking, banking, cryptocurrency, etc. After a post-secrets-provisioning service is provider by the secrets and service provider system, a record of the post-secrets-provisioning service can be placed on a distributed ledger. The record can include a data payload, a timestamp, an identifier of the entity that requested the post-secrets-provisioning service ("requestor"), and the type of post-secrets-provisioning service that was provided.

One example of a post-secrets-provisioning service that can be offered by the secrets and service provider system 130-1 is an on-demand data and/or trust verification service ("verification service"). The verification service can be used to verify the proof of origin of data upon request. For example, the verification service can be used to verify a prior device configuration.

Another example of a post-secrets-provisioning service that can be offered by the secrets and service provider system 130-1 is an on-demand data production service. The data production service can be used to generate data for a device upon request as if it was the device by recreating secrets data. One type of data production service is a data recovery service to recover data that has been lost by the device, such as data that had been encrypted with a previous set of secrets data that is sealed within the device, by having the secrets and service provider system 130-1 recreate the previous set of secrets data using information maintained on the distributed ledger and/or secrets generator. Another type of data production service is a data access service. The data access service can enable secure access to sensitive data (e.g., sensitive files), which can be subject to a limited use and/or temporal scope for data privacy. For example, the secrets and service provider system 130-1 can provide an authorized entity (e.g., upon request from the authorized entity) with a set of secrets data for decrypting an encrypted version of data. The set of secrets data can be designed to be valid only during a defined time period to prevent unlimited access to the data, such that the entity will not be able to decrypt the encrypted version of the data outside of the time period.

Another example of a post-secrets-provisioning service that can be offered by the secrets and service provider system 130-1 is an on-demand file authorization service. The file authorization service is used to authorize a file upon request. To do so, the secrets and service provider system 130-1 can generate, using a set of secrets data obtained by emulating the device, an authorization packet including an encrypted version of a file, and send the authorization packet to the device. Examples of files that can be authorized using the file authorization service include a document, an application, a consumable data packet, etc. The authorization packet enables the device to determine whether the encrypted version of the file is valid for decryption by the device. For example, upon receipt of the authorization packet, the device can determine whether the encrypted file is valid (e.g., the encrypted file is encrypted using the proper secrets data for the device), and internally release a decryption key for decrypting the encrypted file if the encrypted file is valid. Data can be transmitted directly from the requestor to the secrets and service provider 130-1 (e.g., without a brokering agent of the set of brokering agents 120 or other trusted third party) if the requestor can be authenticated by the secret and service provider system 130-1, and if the request is provided in a proper request format.

Another example of a post-secrets-provisioning service that can be offered by the secrets and service provider system 130-1 is an on-demand installation authorization service. The installation authorization service can be provided by the secrets and service provider system 130-1 upon request to determine whether to authorize the installation of an application on a device. For example, the installation authorization service can be provided by the secrets and service provider system 130-1 upon request to determine whether the installation of an application by a vendor while the device is in a vendor provisioning state. In this example, the authorization packet used to determine whether to allow the installation of the application by the vendor can be generated using vendor-generated secrets data, instead of the secrets and service provider system 130-1.

Another example of a post-secrets-provisioning service that can be offered by the secrets and service provider system 130-1 is an on-demand secrets and service provider locator service. The secrets and service provider locator service is a service that, upon receiving a request from a requesting device that the secrets and service provider system 130-1 is not authorized to handle, locates an authorized secrets and service provider system within the system 100 to handle the request. For example, if a secrets and service provider system 130-1 does not have ownership over the requesting device (e.g., it did not provisioning the corresponding set of secrets data onto the device, and thus cannot be authorized to mimic the device to handle the request), the secrets and service provider system 130-1 can contact other secrets and service provider systems within the system 100 to determine an authorized secrets and service provider system to handle the request (e.g., the secrets and service provider system that had provisioned the set of secret data onto the device). Further details regarding the operation of the secrets and service provider system 130-1 to provide post-secrets-provisioning services will be described in further detail below with reference to FIG. 4.

Figure 4:
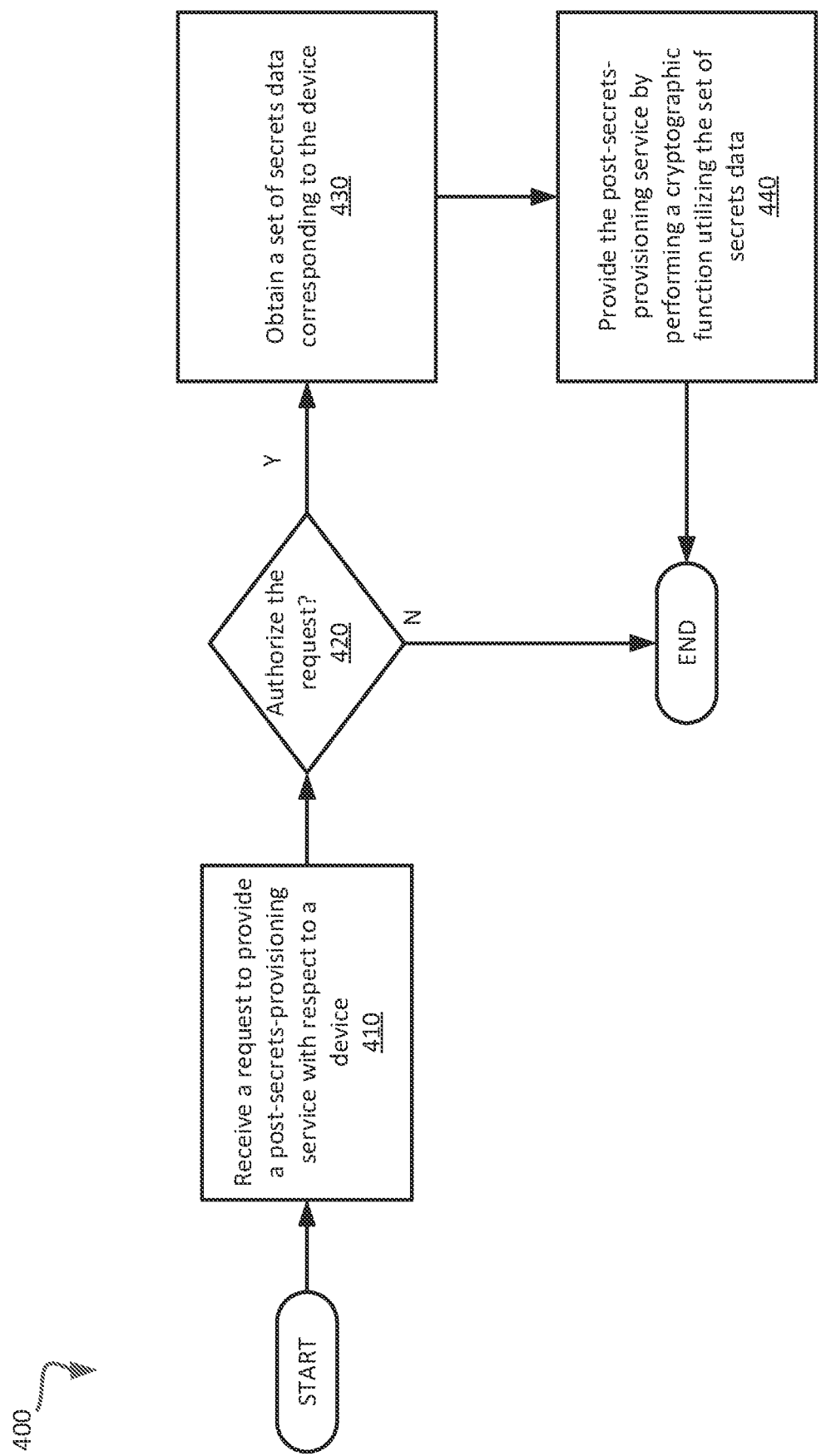
FIG. 4 is a flow diagram of a method to provide cryptographically secure post-secrets-provisioning services, in accordance with some embodiments of the present disclosure.

FIG. 4 is a flow diagram illustrating a method 400 to cryptographically secure post-secrets-provisioning services, in accordance with some embodiments. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. For example, the method 400 can be performed by processing logic implementing the device (e.g., the secrets and service provider system 130-1 of FIG. 1). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic receives a request to provide a post-secrets-provisioning service with respect to a device. The request can be received from a brokering agent on behalf of the device. The post-secrets-provisioning service can include a data or trust verification service, a data production service, a file authorization service, a service to locate a secrets and service provider system to handle the request, etc. Further details regarding types of post-secrets provisioning services are described above with reference to FIGS. 1-3.

At operation 420, the processing logic determines whether to authorize the request. For example, determining whether to authorize the request can include verifying that the processing device has ownership of the device. The verification can be made by using a distributed ledger that maintains records related to proof of ownership of devices. If the request is not authorized, then the processing logic does not provide the service as it is not authorized to do so, and the process ends. Additionally or alternatively, determining whether to authorize the request can include determining whether the request is provided in a proper format. Further details authorizing the request are described above with reference to FIGS. 1-3.

If the request is authorized, at operation 430, the processing logic obtains a set of secrets data corresponding to the device. In some embodiments, the set of secrets data corresponds to a state of a device. The state of the device can correspond to a supply chain state of the device within a supply chain. For example, the state can be a manufacturer provisioning state corresponding to a manufacturing stage of the supply chain associated with the device manufacturer, a vendor provisioning state corresponding to a vendor stage of the supply chain associated with a vendor in possession of the device, an end-use provisioning state corresponding to a end-use stage of the supply chain, an operational state corresponding to an operational stage of the supply chain, etc. The set of secrets data can include a set of manufacturer secrets data, a set of vendor secrets data, a set of end-use secrets data, or a set of operational secrets data. The brokering agent can be at least one of a manufacturer brokering agent, a vendor brokering agent, an end-use brokering agent, an operational brokering agent, etc. In some embodiments, obtaining the set of secrets data includes generating the set of secrets data utilizing at least one of the distributed ledger (e.g., the distributed ledger maintain on ledger 316) or a secrets generator (e.g., secrets generator 312). For example, the distributed ledger maintains historical records of data for the device that can be used by the secrets generator to recreate the set of secrets data.

At operation 440, the processing logic provides the post-secrets-provisioning service by performing a cryptographic function utilizing the set of secrets data. That is, by recreating a current set of secrets data that is currently stored on the device while the device is in a current state or by recreating a previous set of secrets data corresponding to a previous device state that is currently inaccessible by the device (e.g., cryptographically sealed), the processing logic can emulate the functionality of the device in order to provide a particular service that utilizes the particular set of secrets data.

For example, with respect to data recovery that can be performed as a type of data production service, the device may have replaced a previous version of a set of secrets data with a more recent version of the set of secrets data. Thus, the previous set of secrets data may need to be recreated using the information stored on the distributed ledger to enable the device to recover data that was encrypted with the previous version of the set of secrets data. As another example, the set of secrets data may be a sealed set of secrets data from a previous device state, and thus the sealed set of secrets data may need to be recreated to enable the device to recover data that was encrypted using the sealed set of secrets data.

Further details regarding operations 410-430 are described above with reference to FIGS. 1-3 and will be described in further detail below with reference to FIGS. 5-7.

Figure 5:
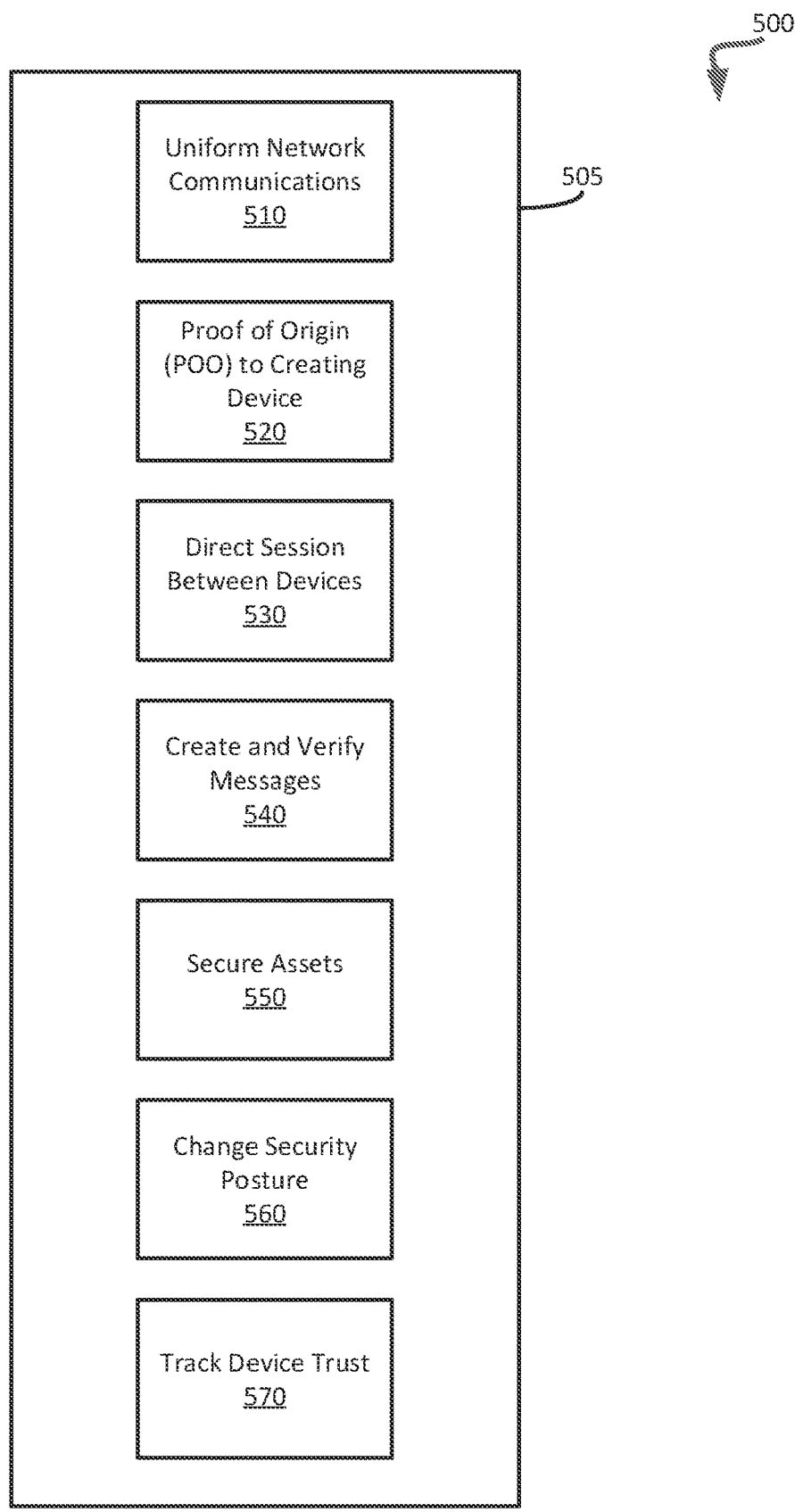
FIG. 5 is a block diagram of example application programming interface (API) methods for providing cryptographically secure post-secrets-provisioning services, in accordance with some embodiments of the present disclosure.

FIG. 5 is a diagram 500 of application programming interface (API) methods for providing cryptographically secure post-secrets-provisioning services, in accordance with some embodiments of the present disclosure. As shown, the diagram 500 includes an API library 505. The API library 505 can be maintained on a cryptographic trust enabled device. For example, the API library 505 can be similar to the API library 114 maintained on the device 110-1, as described above with reference to FIG. 1. In this example, the API library 505 maintains a number of APIs 510 through 570 that implement various functionalities related to enabling cybersecurity features.

A uniform network communications API 510 can obtain a single-use ephemeral key for a cryptographic enabled trust device, which can be used for any suitable purpose needed by an application. To obtain the single-use ephemeral key, the API 510 can cause the cryptographic enabled trust device to generate the single-use ephemeral key, and the cryptographic enabled trust device can return the single-use ephemeral key in satisfaction of the request. The single-use ephemeral key can be generated by the cryptographic enabled trust device based on a seed string of bits. The single-use ephemeral key can be used to perform symmetric encryption of communications. Each cryptographic trust enabled device that is provisioned by a secrets and service provider system (e.g., the secrets and service provider system 130 of FIG. 1) to operate together on a same network segment can use a same string of bits to generate a same single-use ephemeral key.

A proof of origin (POO) to creating device API 520 can obtain digitally signed content for any data item (e.g., data content, code files, or driver updates) that will be provably linked to the cryptographic enabled trust device. To obtain the digitally signed content, the API 520 can create a POO for a data item, and the cryptographic enabled trust device can generate and send a verifiable POO from the created POO in satisfaction of the request. That is, the digitally signed content serves as a POO for the data item, and can be used to prove that the cryptographic enabled trust device produced the data and that the integrity of the data item has not changed since it was created. A POO can be maintained on a distributed ledger (e.g., of the distributed ledger system 120 of FIG. 1), such that its corresponding data item becomes immutably linked with the POO and takes on properties of a token (e.g., NFT) of the data item.

A direct session between devices API 530 can generate a session key unique to a pair of cryptographic trust enabled devices ("paired devices") (e.g., the device 110-1 and the device 110-N), and establish a paired session between the paired devices. The session key can be produced in a multiple step process between the paired devices. For example, two indecipherable strings of bits can be encrypted and asymmetrically exchanged between the paired devices to produce the same string of bits on each end. The same string of bits can then be to support symmetric encryption of communications between the paired devices. The paired session can be used for any suitable use case, and can persist for as long as the use case requires or can be re-established as required. For example, the paired session can be effective for suitable one-to-one pairing connection-based operations, such as establishing Virtual Private Networks.

A create and verify message API 540 can create a digital proof of integrity for verifying a transferred message which contains input from both a sending cryptographic trust enabled device (e.g., the device 110-1) and a receiving cryptographic trust enabled device (e.g., the device 110-N). The message verification can use a multiple-part handshake sequence, which can additionally be required to complete internal device operations within a preset time for successful operation. This capability can be used by any suitable application to verify that a communication sequence maintains integrity and is completed within the preset timing requirement. For example, the API 540 can be used in embodiments in which the cryptographic enabled trust device implements digital communication for electro-mechanical operations on equipment with physical components.

A secure assets API 550 can provide and track supply chain asset security for an asset on the supply chain. For example, the API 550 can implement supply chain security by utilizing a one-time pad (OTP) feature to verify a string of bits, which can be related to either a serial/model number for physical items or configuration/version number for digital content. Supply chain asset security can be verified at one point in time, and then verified against the same string of bits at a later point in time or in a different location. Supply chain asset security for an asset can be tracked by having a cryptographic enabled trust device generating an OTP response including a verification code based on asset identity, and verifying whether the response repeats the anticipated or previous stored value based on the verification code. The verification can optionally be done with support of the secrets and service provider system 130.

A change security posture API 560 can implement security posture changes to enable changing of non-public secrets in a predictable but non-reversible manner. A device may also be reverted to its vendor-programmed state, to clear all network data and await a new set of secrets data. A security posture change can be performed by the API 560 in various ways.

One way that a security posture change can be performed by the API 560 is by implementing a roll feature to roll from a first internal value (e.g., internal string of bits) of the cryptographic enabled trust device to a second internal value of the cryptographic enabled trust device. The roll feature can utilize the OTP feature described above to create a new unknown internal value (internal secret) based on a seed value, which is subsequently used to replace the existing unknown internal value. This feature enables all devices that are provisioned for ephemeral key network segment operations to simultaneously change their internal values while keeping their respective internal values secrets.

Another way to that a security posture change can be performed by the API 560 is by re-provisioning and replacing existing internal values with new internal values. Re-provisioning and replacing the existing internal values can be performed using the secrets and service provider system (e.g., secrets and service provider system 130) through a process which invokes a temporary state change in the cryptographic enabled trust device, after which a new set of keys and a permission sequence to commit the temporary state change to a permanent state change are received.

A track device trust API 570 receives a configuration sequence generated by the cryptographic enabled trust device to: (1) verify a POO for a previously created data item; (2) verify whether internal content of the cryptographic enabled trust device itself has not changed, or that the internal content matches a known or expected value; and/or (3) determine that the data item is received from an authorized source. The verification process can be done with respect to a data item having an external origin relative to the cryptographic enabled trust device and/or can be optionally be performed with support of the secrets and service provider system 130.

Figure 6:
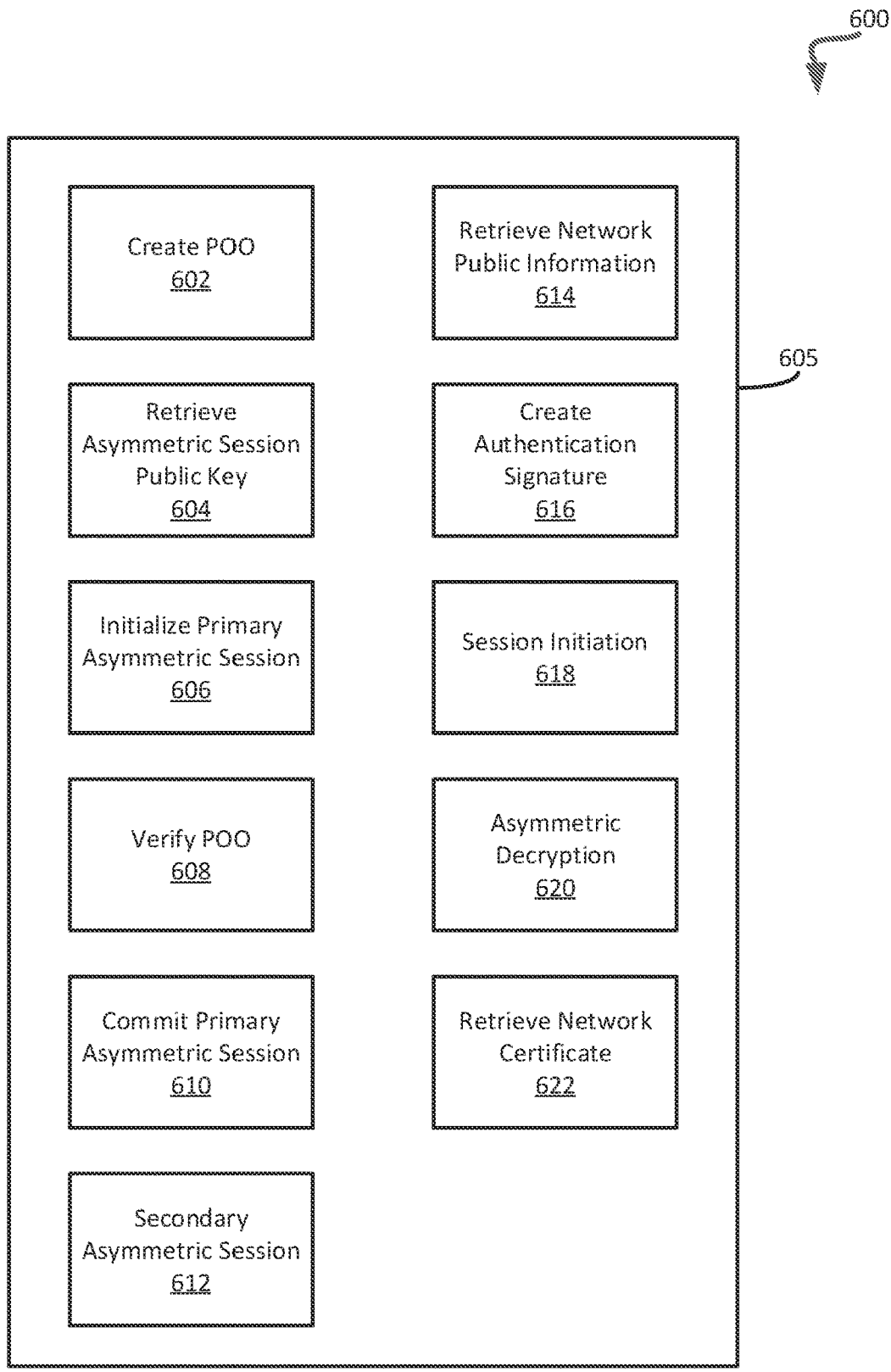
FIG. 6 is a block diagram of example asymmetric application programming interface (API) methods for providing cryptographically secure post-secrets-provisioning services, in accordance with some embodiments of the present disclosure.

FIG. 6 is a diagram 600 of asymmetric API methods for providing cryptographically secure post-secrets-provisioning services, in accordance with some embodiments of the present disclosure. The asymmetric API methods can utilize asymmetric key pairs (e.g., private key and public key), which can provide enhanced security relative to symmetric API methods, such as those described below with reference to FIG. 7.

As shown, the diagram 600 includes an API library 605. The API library 605 can be maintained on a cryptographic trust enabled device. The API library 605 can be maintained on a cryptographic trust enabled device. For example, the API library 605 can be similar to the API library 114 maintained on the device 110-1, as described above with reference to FIG. 1. In this example, the API library 605 maintains a number of APIs 602-622 that implement various asymmetric API methods for enabling cybersecurity features. Other devices (e.g., device 110-N) can maintain respective API libraries.

A create proof of origin (POO) API 602 can create a POO for a data item that proves the origin of the data item. To create the POO, the API 602 passes input data to be digitally signed. The input data can include a data item and a hash of the data item. More specifically, the data item can be received by an application as an input that includes anything needed by the application to function, and a hash operation can be performed on the data item to generate the hash. A create authentication signature API 616 can use an internal asymmetric signing key to perform a digital signing operation on the input data to create the POO. To provide additional security with respect to POO creation, a public signing key can be used as an input to the hash operation.

A retrieve asymmetric session public key API 604 is performed to retrieve an asymmetric session public key. The asymmetric session public key can be used by an initiating cryptographic trust enabled device (e.g., device 110-1) for creating a pairing session with a session target cryptographic trust enabled device (e.g., device 110-N). To retrieve the asymmetric session public key, the API 604 can request the asymmetric session public key through a session initiation API 618. The API 618 can return a public portion of the key. This capability can be used as needed by the application, and can be used when exchanging public access as part of the multiple step process described with respect to the API 530.

An initialize primary asymmetric session API 606 can set up a first stage session between the initiating cryptographic enabled trust device and the session target cryptographic trust enabled device with a remote public key, as part of a multiple step process in conjunction with the API 604, a commit primary asymmetric session API 610, and a secondary asymmetric session API 612. When executed, the API 606 can place the initiating cryptographic enabled trust device in an elevated state (from a normal state) to begin the process of creating a shared session key paired with the session target cryptographic trust enabled device, and returning a random string of bits as an output. As will be described in further detail below, the random string of bits can be sent to a second asymmetric session API 612 to move to the next state in the pairing process.

A verify POO API 608 enables the verification of the POO (the POO created using the API 602) when the initiating and session target cryptographic trust devices are from the same issuing organization. To verify the POO, a set of data including POO signature bits and the initial data segment can be received, and verification of accuracy of the set of data can be performed to obtain a POO verification response that is signified by a status change internal to the initiating cryptographic trust enabled device. An asymmetric decryption API 620 can be used as part of this operation, which performs internal asymmetric decryption within protected memory to provide the POO verification response.

The commit primary asymmetric session API 610 can commit a primary asymmetric session between the initiating cryptographic enabled trust device and the session target cryptographic trust enabled device, upon the initiating cryptographic trust enabled device entering the elevated state (e.g., with respect to the API 606 or the API 612). The functionality performed with respect to the API 610 completes the multiple step process to create a full session key, which is a product of the operations on both the initiating cryptographic trust enabled device and the session target cryptographic trust enabled device. Both of the initiating and session target cryptographic trust enabled devices can be provisioned with the same session key, and the elevated state subsequently returns to a normal state. The verified POO can be optionally used to verify a remote cryptographic trust enabled device entering into the pairing, enabling a higher level of assurance of the authenticity for the cryptographic trust enabled devices.

A secondary asymmetric session API 612 can implement a secondary asymmetric session as part of the multiple step process in conjunction with the APIs 604, 606 and 610. When the API 612 is executed, the initiating cryptographic enabled trust device can be placed in an elevated state to begin the multiple step process of creating a shared session key paired with the session target cryptographic trust enabled device with respect to the primary asymmetric session initialization performed by the API 606.

A retrieve network public information API 614 can retrieve a public certificate for asymmetric sessions between two devices. The public certificate can enable increased security of legacy network communications as the public certificate can be provisioned and sequenced on the distributed ledger. To obtain the public certificate, the API 614 can request that the public certificate be returned using a retrieve network certificate API 622, and the API 622 can return the public certificate to satisfy the request. The origin of the public certificate can also be verified for certificate revocation operations.

Figure 7:
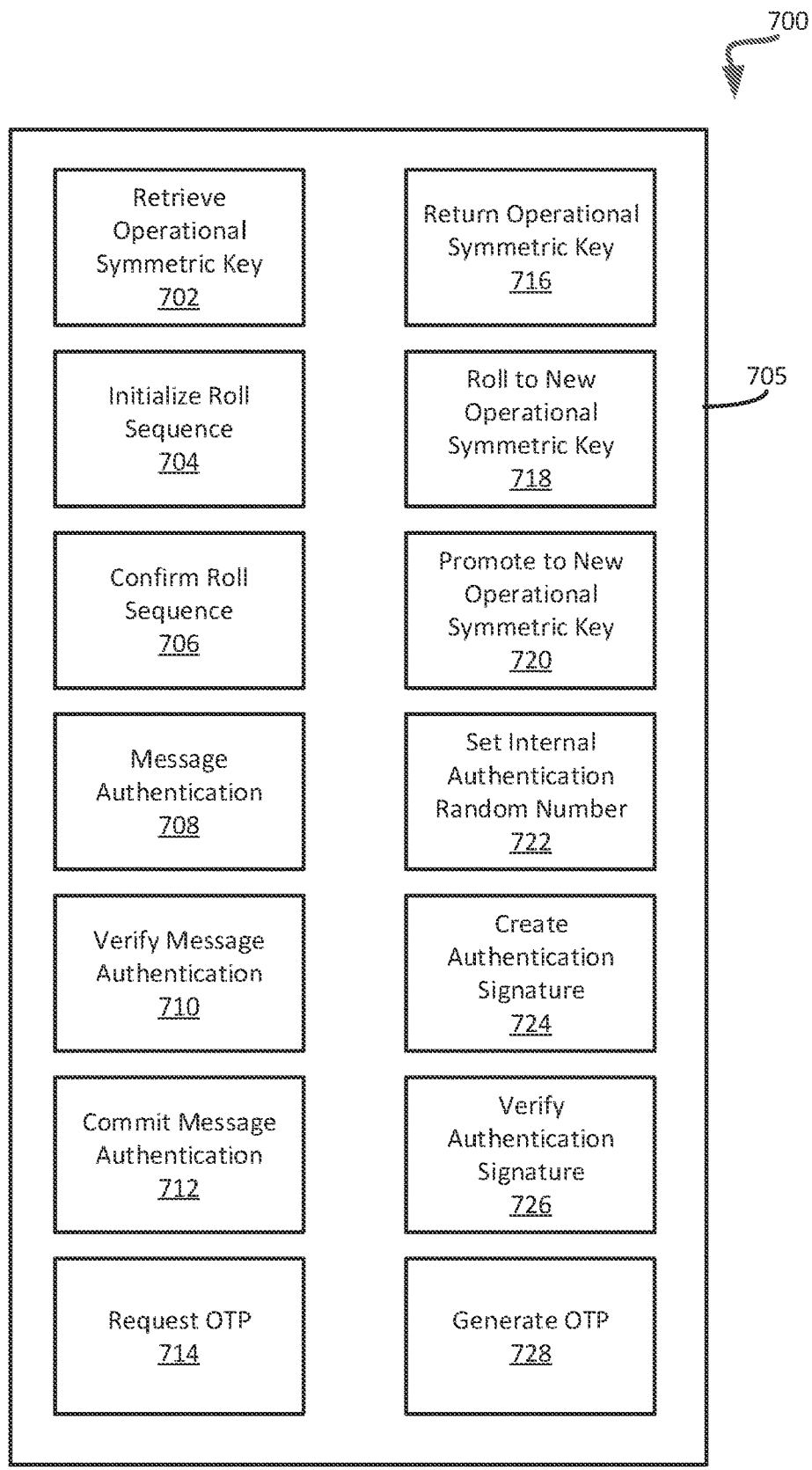
FIG. 7 is a block diagram of example symmetric application programming interface (API) methods for providing cryptographically secure post-secrets-provisioning services, in accordance with some embodiments of the present disclosure.

FIG. 7 is a diagram 700 of symmetric API methods for providing cryptographically secure post-secrets-provisioning services, in accordance with some embodiments of the present disclosure. As shown, the diagram 700 includes an API library 705. The API library 705 can be maintained on a cryptographic trust enabled device. For example, the API library 705 can be similar to the API library 114 maintained on the device 110-1, as described above with reference to FIG. 1. In this example, the API library 705 maintains a number of APIs 702-728 that implement various symmetric API functionalities related to enabling cybersecurity features. Other devices (e.g., device 110-N) can maintain respective API libraries.

A retrieve operational symmetric key API 702 can retrieve an operational symmetric key. The operational symmetric key can be a one-time pad (OTP), which is generated and internally stored to support uniformly encrypted communications between similarly provisioned cryptographic trust enabled devices. To do so, the API 702 can request that the cryptographic enabled trust device provide a current operational symmetric key, and the current operational symmetric key can returned from the cryptographic trust enabled device through a return operating symmetric key API 716. This feature can be utilized for a network segment where all cryptographic enabled trust devices on the network segment could produce this same key and thus seamlessly communicate while encrypting all communications. Additionally or alternatively, this feature can be used on products, such that all products of the same model can utilize encrypted communications between a product and the secrets and service provider system (e.g. the secrets and service provider system 130 of FIG. 1). The API 702 can work in conjunction with an initialize roll sequence API 704 and a confirm roll sequence API 706, which can be used to updating a current operational symmetric key that can be retrieved by the API 702.

The initialize roll sequence API 704 can initiate a multiple stage process for updating the current operational symmetric key to a new operational symmetric key within a cryptographic trust enabled device. The multiple stage process starts by receiving a proper formatted roll token from a controller which supervises the network segment or product model targeted for a new symmetric operations key, and passing the roll token to the cryptographic trust enabled device. The receipt and verification of the roll token cause a "roll to new operational symmetric key" API 718 to temporarily elevate the status of the cryptographic trust enabled device to a supersession state. In the supersession state, both the new and old operational symmetric keys are present and usable. When the cryptographic enabled trust device is in the elevated state, the supersession process starts, and a verification sequence can be completed before a new roll sequence is started. The roll sequence does not end until successful completion of the functionality implemented by the API 606, or interruption of the roll sequence by internal or external processes.

As mentioned above, the API 706 can complete the roll sequence verification, which was initialized with respect to the API 704. The roll sequence verification is completed when a commit token having format that proves that the operation of both the old and new operational symmetric keys together is passed to the cryptographic enable trust device, and a "promote to new operational symmetric key" API 720 promotes the old operational symmetric key to the new operational symmetric key. The old operational symmetric key can then be purged from the memory of the cryptographic trust enabled device.

A message authentication API 708 can retrieve, using a "set internal authentication random number (RN)" API 722, a unique verification code for cryptographic trust enabled device to verify a data item. The verification code can be used to authenticate commands that are then verifiable by another cryptographic trust enabled device which has the same authentication secret. That is, the verification code can be designed for mutual authentication where both cryptographic enabled trust devices use a two-way handshake sequence in conjunction with a verify message authentication API 710.

The verify message authentication API 710 can be used with the message authentication API 708 to verify the message authentication by generating an authentication package. If the API 708 is implemented on a remote cryptographic trust enabled device that is calling the API 720 on a local cryptographic trust enabled device, then the API 708 that is calling a create authentication signature API 724 is utilized for the second part of the handshake on the local cryptographic trust enabled device, or vice versa. The sequence performed by the API 710 can also add a unique randomized input to the authentication sequence, similar to the API 708. The unique randomized input added to the authentication sequence can enable the local and remote cryptographic trust enabled devices to verify each other as part of the message sequence between the local and remote cryptographic trust enabled devices.

A commit message authentication API 712 can complete the message authentication sequence that started with respect to the message authentication API 708 by generating a verification package to commit the message authentication. More specifically, the commit message authentication API 712 can call a verify authentication signature API 726 to obtain finished verification content and gain a temporary key to decrypt the finished verification content.

A request OTP API 714 can be used with many different OTP generation modes that switch the internally used secrets within a cryptographic trust enabled device. An OTP generation mode can be chosen by selecting an operational secret, and then calling a "generate OTP" API 728 to generate an OTP. The OTP can be a temporary code used to authenticate source of data, verification of integrity, as a communication encryption key, or for any other cryptographic operational inputs. The OTP is related to the data and can be reproduced by the same data on a cryptographic trust enabled device which is provisioned for the same end-use segment or for uniform operation on the same product model.

Figure 8:
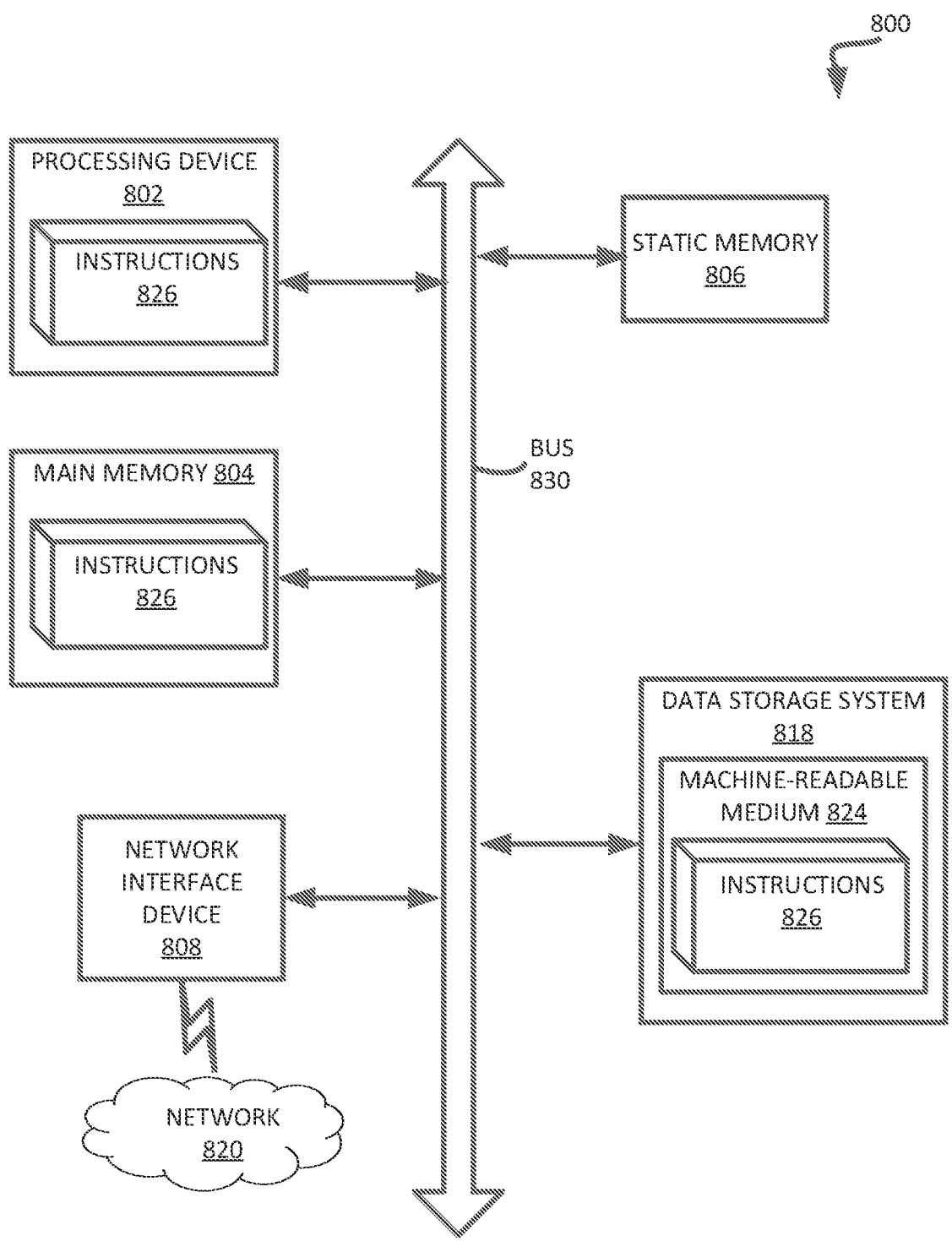
FIG. 8 is a block diagram of an example computer system in which embodiments of the present disclosure may operate.

FIG. 8 illustrates an example machine of a computer system 800 within which a set of instructions, for causing the machine to perform any one or more of the methodologies discussed herein, can be executed. In some embodiments, the computer system 800 can be implemented by a cryptographic trust enabled device ("device") (e.g., the device 110-1 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or RDRAM, etc.), a static memory 806 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 800 can further include a network interface device 808 to communicate over the network 820.

The data storage system 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media.

In one embodiment, the instructions 826 include instructions to implement functionality corresponding to cryptographic enabled trust device. While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a memory; and
   a processor, operatively coupled to the memory, to perform operations comprising:
      receiving a request to provide a post-secrets-provisioning service with respect to a device having a supply chain state corresponding to a supply chain associated with the device, wherein the supply chain state is one of: a manufacturing provisioning state corresponding to a manufacturing stage of the supply chain, a vendor provisioning state corresponding to a vendor stage of the supply chain, a network provisioning state corresponding to a network stage of the supply chain, or an operational state corresponding to an operational stage of the supply chain;
      in response to receiving the request, determining whether to authorize the request based on a proof of ownership of the device;
      in response to authorizing the request, obtaining a set of secrets data corresponding to the supply chain state of the device; and
      emulating, by utilizing the set of secrets data, the device having the supply chain state to provide the post-secrets-provisioning service.

2. The system of claim 1, further comprising a distributed ledger maintaining the proof of ownership of the device.

3. The system of claim 2, wherein obtaining the set of secrets data comprises generating the set of secrets data using at least one of the distributed ledger or a secrets generator.

4. The system of claim 1, wherein providing the post-secrets-provisioning service comprises at least one of: providing a data or trust verification service, providing a data production service, providing a file authorization service, or providing a service to locate a secrets and service provider system to handle the request.

5. The system of claim 4, wherein the set of secrets data comprises a previous set of secrets data, and wherein providing the data production service comprises recovering data encrypted with the previous set of secrets data.

6. The system of claim 4, wherein providing the file authorization service comprises:
   generating, using the set of secrets data, an authorization packet comprising an encrypted version of a file; and
   sending, to the device, the authorization packet to enable the device to determine whether the encrypted version of the file is valid for decryption by the device.

7. The system of claim 6, wherein the file comprises at least one of: a document, an application, or a consumable data packet.

8. A method comprising:
   receiving, by a processor, a request to provide a post-secrets-provisioning service with respect to a device having a supply chain state corresponding to a supply chain associated with the device, wherein the supply chain state is one of: a manufacturing provisioning state corresponding to a manufacturing stage of the supply chain, a vendor provisioning state corresponding to a vendor stage of the supply chain, a network provisioning state corresponding to a network stage of the supply chain, or an operational state corresponding to an operational stage of the supply chain;
   in response to receiving the request, determining, by the processor, whether to authorize the request based on a proof of ownership of the device;
   in response to authorizing the request, obtaining, by the processor, a set of secrets data corresponding to the supply chain state of the device; and
   emulating, by the processor utilizing the set of secrets data, the device having the supply chain state to provide the post-secrets-provisioning service.

9. The method of claim 8, wherein the proof of ownership of the device is maintained on a distributed ledger.

10. The method of claim 9, wherein obtaining the set of secrets data comprises generating the set of secrets data using at least one of the distributed ledger or a secrets generator.

11. The method of claim 8, wherein providing the post-secrets-provisioning service comprises at least one of: providing a data or trust verification service, providing a data production service, providing a file authorization service, or providing a service to locate a secrets and service provider system to handle the request.

12. The method of claim 11, wherein the set of secrets data comprises a previous set of secrets data, and wherein providing the data production service comprises recovering data encrypted with the previous set of secrets data.

13. The method of claim 11, wherein providing the file authorization service comprises:
generating, using the set of secrets data, an authorization packet comprising an encrypted version of a file; and
sending, to the device, the authorization packet to enable the device to determine whether the encrypted version of the file is valid for decryption by the device.

14. The method of claim 13, wherein the file comprises at least one of: a document, an application, or a consumable data packet.

15. A non-transitory computer-readable storage medium comprising instructions that, when executed by a processing device, cause the processing device to perform operations comprising:
receiving a request to provide a post-secrets-provisioning service with respect to a device having a supply chain state corresponding to a supply chain associated with the device, wherein the supply chain state is one of: a manufacturing provisioning state corresponding to a manufacturing stage of the supply chain, a vendor provisioning state corresponding to a vendor stage of the supply chain, a network provisioning state corresponding to a network stage of the supply chain, or an operational state corresponding to an operational stage of the supply chain, and wherein the post-secrets-provisioning service comprises at least one of: a data or trust verification service, a data production service, a file authorization service, or a service to locate a secrets and service provider system to handle the request;
in response to receiving the request, determining whether to authorize the request based on a proof of ownership of the device maintained on a distributed ledger;
in response to authorizing the request, obtaining a set of secrets data using the distributed ledger, wherein the set of secrets data corresponds to the supply chain state of the device; and
emulating, by utilizing the set of secrets data, the device having the supply chain state to provide the post-secrets-provisioning service.

16. The non-transitory computer-readable storage medium of claim 15, wherein the set of secrets data comprises a previous set of secrets data, wherein the post-secrets-provisioning service is a data production service, and wherein providing the data production service comprises recovering data encrypted with the previous set of secrets data.

17. The non-transitory computer-readable storage medium of claim 15, wherein the post-secrets-provisioning service is a file authorization service, and wherein providing the file authorization service comprises:
generating, using the set of secrets data, an authorization packet comprising an encrypted version of a file; and
sending, to the device, the authorization packet to enable the device to determine whether the encrypted version of the file is valid for decryption by the device.

18. The non-transitory computer-readable storage medium of claim 17, wherein the file comprises at least one of: a document, an application, or a consumable data packet.

19. The non-transitory computer-readable storage medium of claim 15, wherein obtaining the set of secrets data comprises generating the set of secrets data.

\* \* \* \* \*